Patented Aug. 8, 1939

2,168,722

UNITED STATES PATENT OFFICE

2,168,722

PROCESS FOR THE PRODUCTION OF PRE-DIGESTED VEGETABLE FOODSTUFF FOR ANIMALS

Charles Samuel Townsend, Ealing, England, assignor to Wellesley Holdings Limited, London, England, a British company No Drawing. Application August 3, 1937, Serial No. 157,220. In Great Britain August 10, 1936

3 Claims. (Cl. 99—9)

This invention relates to a foodstuff for animals and it has for its object the production of such a foodstuff which has been pre-digested and which contains iodine in organic combination.

A further object of the invention is to provide a process for producing the above foodstuff.

Broadly the present invention consists of a pre-digested foodstuff for animals containing iodine in organic combination and produced by adding fish offal to seaweed and then subjecting the mixture to fermentation by thermophile bacteria at such temperature and for a period which will effect pre-digestion and partial de-hydration of the mass and the organic combination therewith of iodine from the seaweed.

The fermentation of the mass is preferably effected by a process which consists in impregnating the matter with anaerobic and aerobic thermophile bacteria either singly or together and causing the same to be acted upon by the bacteria in two stages, in the first stage by anaerobic bacteria by excluding air from the mass and for a period sufficient for the temperature of the mass to rise to over 50° C. to permit the thermophile bacteria to become active and in the second stage by the aerobic thermophile bacteria by causing the mass to be aerated, such second stage being continued for a period sufficient for the temperature to rise until a required optimum temperature for the thermophile bacteria is attained when said temperature is maintained until the material has become sufficiently degraded and de-hydrated. Such a process is described in Patent application No. 165,977.

The bacteria may be introduced into the mass in a liquid medium which consists of a bacteria infected liquid or is prepared by adding to water a culture of anaerobic and aerobic thermophile bacteria, a bacteria nutrient such for example as cane molasses, sugar beet tailings or other suitable carbohydrate containing material being added to the liquid. This liquid bacteria medium may be sprayed onto the mass to be treated after the same has been placed in a suitable chamber or digester.

The bacteria may either be obtained as pure cultures or an existing bacteria infested liquid, such for example as cow urine may be used.

The hydrogen ion concentration which should be slightly below the neutral point, for instance at a pH of 7.5 to 8.0 may be controlled by a suitable addition of a neutral readily decomposable salt of a weak alkali, for example calcium carbonate (carbonate of lime).

The digestion or fermentation of the mass is as stated above preferably carried out in two stages. In the first stage the conditions within the chamber or digester are made such as to encourage the development of the anaerobic bacteria for example by suitably sealing the chamber whilst in the second stage the chamber is unsealed and air and/or oxygen is passed through the mass to activate the aerobic bacteria. This activity is allowed to develop until temperatures of from 75° C. to 80° C. are attained and such temperatures are maintained to cause the thermal death of putrefactive and other undesirable organisms and to effect de-hydration of the mass to a point where the moisture in the mass is reduced to from 12½% to 17½% of its original moisture content.

During this bacterial activity the watery vapours developed are allowed to escape or are drawn off by suction fans at a controlled rate so as to maintain the mass at the desired elevated temperature.

When de-hydration is sufficiently effected the mass may be removed from the chamber or digester and suitably cooled.

The ammonia gas given off during fermentation may be carried off into a collection chamber and there recovered as a bye-product in the form of sulphate of ammonia.

As an example of one application of the invention we will now describe the production of a poultry or hog food having equal parts of fish-offal and seaweed as its base.

The seaweed used is preferably of the *Laminaria digitala* type and before use this is washed in cold fresh water. The washed seaweed is then macerated such as by a macerating machine to increase the effective surface and thus facilitate the subsequent bacterial action. The fish-offal is then added to the macerated seaweed and the two are thoroughly mixed together. The mixed mass is now introduced into the chamber or digester and assuming that there is a total weight of 50 tons there is sprayed onto the mass 2,000 gallons of the prepared bacterial fluid containing both the anaerobic and aerobic bacteria. Any surplus fluid as well as moisture released during fermentation may be permitted to escape through an outlet at the base of the chamber and if desired such surplus may be re-introduced onto the upper surface of the mass to be treated during the anaerobic stage.

When the mass has absorbed sufficient of the bacterial fluid the chamber is sealed and the first of anaerobic stage in the fermentation process is allowed to commence. Anaerobic fermentation is allowed to continue for about ten days.

At the end of this period valves controlling the escape of watery vapours are opened and the withdrawal fans started. Air is now admitted to the chamber at one or more suitable points such as at the bottom and/or sides whereby the same will diffuse fairly evenly through the mass and produce the best conditions possible for the aerobic fermentation to take place.

This second stage in the process is continued until the moisture content has become reduced to the desired percentage.

The product resulting from the above example of the process is a pre-digested de-hydrated and concentrated animal foodstuff containing iodine in organic combination.

I claim:

1. Process for producing a pre-digested animal foodstuff consisting in mixing together fish offal and seaweed and converting the same into a pre-digested, de-hydrated and aseptic product by subjecting the mixture to the action of thermophilic aerobic bacteria until fermentation has been completed.

2. Process for producing a pre-digested animal foodstuff consisting in mixing together fish offal and seaweed and converting the same into a pre-digested, de-hydrated and aseptic product by subjecting the same to anaerobic bacteria to effect partial fermentation and then to the action of thermophilic aerobic bacteria until fermentation has been completed.

3. A process for producing a pre-digested foodstuff consisting in mixing together fish offal and seaweed, subjecting the mixture to anaerobic bacteria action by excluding the air from the mass, subjecting the mass to aerobic bacteria action caused by thermophile bacteria, and maintaining at the elevated temperature until a food product is obtained which contains not more than 17½% of its original moisture content.

CHARLES SAMUEL TOWNSEND.